United States Patent
Mock et al.

(10) Patent No.: US 7,835,814 B2
(45) Date of Patent: *Nov. 16, 2010

(54) TOOL FOR REPORTING THE STATUS AND DRILL-DOWN OF A CONTROL APPLICATION IN AN AUTOMATED MANUFACTURING ENVIRONMENT

(75) Inventors: Michael W. Mock, St. George, VT (US); Gary R. Moore, Milton, VT (US); Justin W. Wong, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 597 days.

This patent is subject to a terminal disclaimer.

(21) Appl. No.: 11/839,749

(22) Filed: Aug. 16, 2007

(65) Prior Publication Data

US 2009/0049345 A1    Feb. 19, 2009

(51) Int. Cl.
*G06F 19/00* (2006.01)
*G06F 11/00* (2006.01)

(52) U.S. Cl. .................. 700/108; 700/121; 700/110; 714/100

(58) Field of Classification Search .............. 700/108
See application file for complete search history.

(56) References Cited

U.S. PATENT DOCUMENTS

| | | | |
|---|---|---|---|
| 6,980,873 B2 * | 12/2005 | Shen | 700/108 |
| 7,010,382 B2 | 3/2006 | Cheng et al. | |
| 7,027,943 B2 | 4/2006 | Steinkirchner et al. | |
| 7,099,729 B2 | 8/2006 | Tai et al. | |
| 7,114,104 B1 | 9/2006 | Bennett | |
| 7,254,513 B2 | 8/2007 | Lin et al. | |
| 7,369,962 B2 | 5/2008 | Sandstrom et al. | |
| 7,395,131 B2 * | 7/2008 | Funk | 700/108 |
| 7,493,236 B1 | 2/2009 | Mock et al. | |
| 7,526,685 B2 | 4/2009 | Noy et al. | |
| 2002/0013635 A1 * | 1/2002 | Gotou et al. | 700/108 |

(Continued)

OTHER PUBLICATIONS

Mock et al., U.S. Appl. No. 11/839,689, Office Action Communication, Mar. 18, 2010, 4 pages.

(Continued)

*Primary Examiner*—Albert DeCady
*Assistant Examiner*—Sivalingam Sivanesan
(74) *Attorney, Agent, or Firm*—Gibb I.P. Law Firm, LLC (57) ABSTRACT

Disclosed are embodiments that provide near real-time monitoring of a control application in a manufacturing environment to detect and determine the root cause of faults within the control application. The embodiments monitor the flow of data within the control application during events (i.e., transactions, stages, process steps, etc.). By comparing a dataflow path for a near real-time event with historical dataflow path records, dataflow interruptions (i.e., fails) within the control application can be detected. By determining the location of such a dataflow interruption, the root cause of the control application fail can be determined. Additionally, the invention can generate summary reports indicating the status of the control application. For example, the summary reports can quantify the performance and/or the effectiveness of the control application. These summary reports can further be generated with drill downs to provide a user with direct access to the records upon which the reports were based.

20 Claims, 10 Drawing Sheets

U.S. PATENT DOCUMENTS

2004/0225402 A1    11/2004  Chang et al.
2005/0171627 A1*   8/2005   Funk et al. ................. 700/121
2005/0187649 A1    8/2005   Funk et al.
2006/0075314 A1*   4/2006   Lin et al. .................... 714/100
2006/0184264 A1*   8/2006   Willis et al. ................. 700/108

OTHER PUBLICATIONS

Mock et al., U.S. Appl. No. 11/839,796, Office Action Communication, Mar. 18, 2010, 4 pages.
U.S. Appl. No. 11/839,689, Notice of Allowance, May 3, 2010.
U.S. Appl. No. 11/839,796, Notice of Allowance, May 12, 2010.

* cited by examiner

Figure 1

FDC Model Tracking
300mm Technology Summary Table
Production from 06/02/2007 to 06/08/2007

| Technology | Total WC Pass | WC Pass with FDC Models | Best Case % Coverage | WC Pass Able to INHIBIT | WC Pass without FDC Models | % Broken WC Pass | Current %Coverage |
|---|---|---|---|---|---|---|---|
| A | 4 | 0 | 0% | 0 | 4 | 0 % | 0 % |
| B | 154 | 21 | 14 % | 21 | 133 | 13.6 % | 13.6 % |
| C | 271 | 59 | 22 % | 59 | 212 | 33.9 % | 21.8 % |
| D | 422 | 99 | 23 % | 99 | 323 | 22.3 % | 23.5 % |
| E | 58,925 | 23,717 | 40 % | 22,871 | 35,208 | 4.5 % | 38.8 % |
| F | 28,763 | 11,502 | 40 % | 11,188 | 7,261 | 2.7 % | 38.9 % |
| G | 9,147 | 3,708 | 41 % | 3,655 | 5,439 | 3.4 % | 40 % |
| H | 3,115 | 1,286 | 41 % | 1,286 | 1,829 | 3 % | 41.3 % |
| I | 10,540 | 4,730 | 45 % | 4,719 | 5,810 | 3.9 % | 44.8 % |
| J | 7,449 | 3,944 | 53 % | 3,917 | 3,505 | 5.4 % | 52.6 % |
| K | 75,008 | 40,919 | 55 % | 40,833 | 34,089 | 5.4 % | 54.4 % |
| L | 17,274 | 10,176 | 59 % | 10,176 | 7,098 | 4.3 % | 58.9 % |
| M | 32 | 20 | 63 % | 20 | 12 | 3.1 % | 62.5 % |
| N | 10,218 | 6,534 | 64 % | 6,474 | 3,684 | 9.3 % | 63.4 % |
| O | 1,395 | 1,086 | 78 % | 1,086 | 309 | 4.8 % | 77.8 % |
| P | 5,866 | 4,593 | 78 % | 4,575 | 1,273 | 8 % | 78 % |
| Q | 382,545 | 324,238 | 85 % | 323,466 | 58,307 | 8 % | 84.6 % |
| R | 85,670 | 76,584 | 89 % | 76,584 | 9,086 | 5.2 % | 89.4 % |
| Totals | 696798 | 513216 | 74 % | 511029 | 183582 | 6.6 % | 73.3 % |

Figure 2

FDC Model Tracking
BEOL-RIE Tool Summary Table
Production from 06/02/2007 to 06/08/2007

| Tool ID | Chambers Used | Total WC Pass | WC Pass with FDC Models | Best Case % Coverage | WC Pass Able to INHIBIT | WC Pass without FDC Models | % Broken WC Pass | Current % Coverage |
|---|---|---|---|---|---|---|---|---|
| FK12 | 1 | 11 | 0 | 0% | 0 | 11 | 0% | 0 % |
| FK06 | 4 | 2,027 | 1,261 | 62 % | 1,261 | 766 | 6.1 % | 62.2 % |
| FK07 | 4 | 1,543 | 974 | 63 % | 974 | 569 | 4.6 % | 63.1 % |
| FK05 | 4 | 1,637 | 1,108 | 68 % | 1,108 | 529 | 6.9 % | 67.7 % |
| FK08 | 4 | 2,410 | 1,771 | 73 % | 1,771 | 639 | 4.3 % | 73.5 % |
| FK11 | 4 | 2,519 | 1,907 | 76 % | 1,907 | 612 | 6 % | 75.7 % |
| FK10 | 4 | 1,568 | 1,243 | 79 % | 1,243 | 325 | 5.5 % | 79.3 % |
| FK09 | 4 | 2,164 | 1,786 | 83 % | 1,786 | 378 | 3.6 % | 82.5 % |
| FK04 | 4 | 1,088 | 911 | 84 % | 911 | 177 | 6.2 % | 53.7 % |
| FK01 | 4 | 1,989 | 1,678 | 84 % | 1,678 | 311 | 6.7 % | 84.4 % |
| FK02 | 4 | 2,877 | 2,681 | 93 % | 2,681 | 196 | 2.4 % | 93.2 % |
| FK03 | 3 | 3,190 | 3,020 | 95 % | 3,020 | 170 | 3.3 % | 94.7 % |
| Totals | 44 | 23023 | 18340 | 80 % | 18340 | 4683 | 4.8 % | 79.7 % |

Figure 3

FDC Model Tracking
Tech Center Summary Table
Production from 06/02/2007 to 06/08/2007

| Process | Chambers Used | Total WC Pass | WC Pass with FDC Models | Best Case % Coverage | WC Pass Able to INHIBIT | WC Pass without FDC Models | % Broken WC Pass | Current % Coverage |
|---|---|---|---|---|---|---|---|---|
| FRN | 40 | 3,602 | 1,886 | 52% | 1,886 | 1,716 | 3.7 % | 52.4 % |
| ION | 18 | 79,943 | 42,680 | 53 % | 42,680 | 37,263 | 3 % | 53.4 % |
| RTP | 34 | 31,208 | 19,482 | 62 % | 19,482 | 11,726 | 9.8 % | 62.4 % |
| CMP | 74 | 58,988 | 37,235 | 53 % | 37,235 | 21,753 | 1.3 % | 63.1 % |
| RIE | 169 | 145,113 | 104,022 | 72 % | 103,613 | 41,091 | 5.3 % | 71.4 % |
| MTL | 114 | 165,184 | 127,879 | 77 % | 126,101 | 37,305 | 16.3 % | 76.3 % |
| INS | 95 | 132,321 | 104,169 | 79 % | 104,169 | 28,152 | 2.9 % | 78.7 % |
| WET | 28 | 56,185 | 52,237 | 93 % | 52,237 | 3,948 | 1.7 % | 93 % |
| PLT | 14 | 24,254 | 23,626 | 97 % | 23,626 | 628 | 1.8 % | 97.4 % |
| Totals | 586 | 696798 | 513216 | 74 % | 511029 | 183582 | 6.6 % | 73.3 % |

Figure 4

| Tool ID | Process ID | WC Passes | Proc. Main PD ID | Process PD ID | Physical Recipe | Model Name | Comments |
|---|---|---|---|---|---|---|---|
| JJ05 | PVD77 | 20 | D1LPantheonLPGG.1 | MTLLNREAD.1 | 11SEXLINERREV4 | Brand New Recipe! | Brand New Recipe! |
| JJ05 | PVD22 | 19 | P1SCellBEProd.1 | MTLSiCOHLNRB3P.1 | 11SBXLINER | JJ05PVD2TANTHK1 | Best of Breed! |
| JJ05 | PVD44 | 19 | P9FS4LII0171VY.1 | MTLFTEOSLNRBAP.1 | 9SFGBXLINER | | WSPC Error! |
| JJ05 | PVD77 | 19 | P1SCellBEProd.1 | MTLSiCOOHLNRB3P.1 | 11SBXLINER | JJ05PVD7CUTHK2 | Best of Breed! |

Figure 5

FDC Coverage Detail For Tool JJ05-FDC Process ID 4

Production from 2007-07-07 to 2007-07-07

All Products

Proc Main PD Id_P9FS4LH0171VY.1-ProcPD ID=MTLFTEOSLNRBAP.1

Logical Recipe=MTLFTEOSLNRBAP.1-Physical Recipe=9SFGBXLINER

| Process Time | Control Job ID | Process Mod ID | Lot ID | Wafer ID | Last SPC | Inhibit Flag | Comment |
|---|---|---|---|---|---|---|---|
| 03:40:22 | JJ05-2007-07-07-0005 | PVD4 | 07199F4L010.000 | 90K0IF3PKOF2 | 2007-07-08 | 1 | WSPC Error! |
| 03:40:22 | JJ05-2007-07-07-0005 | PVD4 | 07199F4L010.000 | 90K0IF3QKOC1 | 2007-07-08 | 1 | WSPC Error! |
| 03:40:22 | JJ05-2007-07-07-0005 | PVD4 | 07199F4L010.000 | 90K0IF3RKOG3 | 2007-07-08 | 1 | WSPC Error! |
| 03:40:22 | JJ05-2007-07-07-0005 | PVD4 | 07199F4L010.000 | 90K0IF3SKOD2 | 2007-07-08 | 1 | WSPC Error! |
| 03:40:22 | JJ05-2007-07-07-0005 | PVD4 | 07199F4L010.000 | 90K0IF3UKOE3 | 2007-07-08 | 1 | WSPC Error! |
| 03:40:22 | JJ05-2007-07-07-0005 | PVD4 | 07199F4L010.000 | 90K0IF3VKOB2 | 2007-07-08 | 1 | WSPC Error! |

Broken Arrow Detail

Control Job Id=JJ05-20070707-0005

| Model | DC Item Name | Chart Name | Interval | Lot ID | Wafer ID | Recipe ID | Reason Code |
|---|---|---|---|---|---|---|---|
| JJ05LDGD EGAS | LDG_ FIXED | FIXED1 | Section 1 | 07199F4L0 10.000 | 90K0IF3PKOF2 | MTLBEOL PROD LINER/NOV/JJ05.9SFGBXLINER.0 | 1544 |
| JJ05PCLNT HK1 | PCLN1_ FIXED | FIXED1 | Section 1 | 07199F4L0 10.000 | 90K0IF3PKOF2 | MTLBEOL PROD LINER/NOV/JJ05.9SFGBXLINER.0 | 1544 |
| JJ05PVD4T ATHK2 | 4_ FIXED | FIXED1 | Section 1 | 07199F4L0 10.000 | 90K0IF3PKOF2 | MTLBEOL PROD LINER/NOV/JJ05.9SFGBXLINER.0 | 1544 |
| JJ05PVD7C UTHK3 | 7_ FIXED | FIXED1 | Section 1 | 07199F4L0 10.000 | 90K0IF3PKOF2 | MTLBEOL PROD LINER/NOV/JJ05.9SFGBXLINER.0 | 1544 |
| JJ05LDGD EGAS | LDG_ FIXED | FIXED2 | Section 2 | 07199F4L0 10.000 | 90K0IF3PKOF2 | MTLBEOL PROD LINER/NOV/JJ05.9SFGBXLINER.0 | 1544 |
| JJ05PVD4T ATHK2 | 4_ FIXED | FIXED2 | Section 2 | 07199F4L0 10.000 | 90K0IF3PKOF2 | MTLBEOL PROD LINER/NOV/JJ05.9SFGBXLINER.0 | 1544 |
| JJ05LDGD EGAS | LDG_ VARIABLE | VARIABLE1 | Section 1 | 07199F4L0 10.000 | 90K0IF3PKOF2 | MTLBEOL PROD LINER/NOV/JJ05.9SFGBXLINER.0 | 1544 |
| JJ05PCLN1 THK4 | PCLN1_ VARIABLE | VARIABLE1 | Section 1 | 07199F4L0 10.000 | 90K0IF3PKOF2 | MTLBEOL PROD LINER/NOV/JJ05.9SFGBXLINER.0 | 1544 |
| JJ05PVD4T ATHK2 | 4_ VARIABLE | VARIABLE1 | Section 1 | 07199F4L0 10.000 | 90K0IF3PKOF2 | MTLBEOL PROD LINER/NOV/JJ05.9SFGBXLINER.0 | 1544 |
| JJ05PVD7C UTHK3 | 7_ VARIABLE | VARIABLE1 | Section 1 | 07199F4L0 10.000 | 90K0IF3PKOF2 | MTLBEOL PROD LINER/NOV/JJ05.9SFGBXLINER.0 | 1544 |
| JJ05LDGE GAS | LDG VARIABLE | VARIABLE2 | Section 2 | 07199F4L0 10.000 | 90K0IF3PKOF2 | MTLBEOL PROD LINER/NOV/JJ05.9SFGBXLINER.0 | 1544 |
| JJ05PVD4T ATHK2 | 4_ VARIABLE | VARIABLE2 | Section 2 | 07199F4L0 10.000 | 90K0IF3PKOF2 | MTLBEOL PROD LINER/NOV/JJ05.9SFGBXLINER.0 | 1544 |

TOOL FOR REPORTING THE STATUS AND DRILL-DOWN OF A CONTROL APPLICATION IN AN AUTOMATED MANUFACTURING ENVIRONMENT

CROSS-REFERENCE TO RELATED APPLICATIONS

This application is related to the following co-pending applications filed concurrently herewith by the same Applicants and assigned to the same Assignee, namely, International Business Machines Corporation (IBM Corporation): "A METHOD FOR REPORTING THE STATUS OF A CONTROL APPLICATION IN AN AUTOMATED MANUFACTURING ENVIRONMENT", Ser. No. 11/839,714; "A TOOL FOR REPORTING THE STATUS OF A CONTROL APPLICATION IN AN AUTOMATED MANUFACTURING ENVIRONMENT", Ser. No. 11/839,689; and "A METHOD FOR REPORTING THE STATUS AND DRILL-DOWN OF A CONTROL APPLICATION IN AN AUTOMATED MANUFACTURING ENVIRONMENT", Ser. No. 11/839,796. The complete disclosures of these related co-pending applications are incorporated herein by reference.

BACKGROUND

1. Field of the Invention

The embodiments of the invention generally relate to control applications and, more particularly, to a system and method for monitoring and reporting the status of a control application, such as a fault detection and classification application, in an automated manufacturing environment.

2. Description of the Related Art

Advanced process control (APC) applications are increasingly used in conjunction with manufacturing technology to improve metrics, such as yield, costs, mean time between failures, etc. For example, fault detection and classification (FDC) applications use models to collect and monitor data regarding tool and/or process parameters in order to provide an early warning of tool and/or process faults and, thereby, to avoid having to scrap wafers or entire lots of wafers. However, it is often difficult to identify when a control application has failed or what the root cause of such a control application failure might be. Specifically, it is often difficult to monitor and quantify the effectiveness and performance of a control application in real-time.

SUMMARY

In view of the foregoing, disclosed herein are embodiments of a system, method, and service that provide near real-time monitoring of a control application in a manufacturing environment in order to detect and determine the root cause of faults within the control application. The embodiments monitor the flow of data within a control application during certain events (i.e., certain transactions, stages, process steps, etc.). By comparing a dataflow path for a near real-time event with historical dataflow path records, dataflow interruptions (i.e., fails) within the control application can be detected. By determining the location of such a dataflow interruption, the root cause of the control application fail can be determined. Additionally, the invention can generate summary reports indicating the status of the control application (e.g., over a given period of time). These summary reports can, for example, quantify the performance of the control application (e.g., by indicating a percentage of events during a given period of time for which the control application should have collected data and failed) and/or quantify the effectiveness of the control application (e.g., by indicating a percentage of the events during a given period of time for which the control application had inhibit ability). Additionally, these summary reports can be generated with drill downs to provide a user with direct access to the records upon which the reports were based.

More specifically, disclosed herein is an embodiment of a system for monitoring an advanced process control (APC) application (e.g., an fault detection and classification (FDC) application). The system embodiment can comprise a data retriever adapted to access a plurality of identified data sources (e.g., data logs and databases) for the control application. The data retriever can further be adapted to retrieve, from those data sources, all relevant data regarding selected events (i.e., regarding selected transactions, stages or process steps, such as selected wafer-chamber passes). That is, each time a selected event (e.g., a selected wafer-chamber pass) occurs on a new item (e.g., a wafer) being manufactured, the data retriever will collect data that is associated with that selected event and that is stored in the data sources of the control application.

The system embodiment can further comprise a data compiler adapted to compile this data in order to generate records of dataflow paths within the control application for specific events. Event dataflow path records can be time-stamped and stored by the data compiler on a data storage device.

The system embodiment can further comprise a records analyzer adapted to perform an analysis of the records (e.g., in response to a specific query and/or automatically in response to a continual query) in order to detect any dataflow interruptions within the control application. Specifically, a comparison between a dataflow path record for a current event (i.e., a near real-time event) and historical dataflow path records (i.e., dataflow path records of prior events of the same type) can be performed by the analyzer to detect a dataflow interruption. The analyzer can further be adapted to determine the locations of each of the detected dataflow interruptions. Based on the location of a dataflow interruption, the control application failure can be classified.

The system embodiment can further comprise a summary report generator and a graphical user interface (GUI). This summary report generator can be adapted to generate a summary report indicating the status of the control application (e.g., over a given period of time), based on the records. More particularly, the summary report can be generated based on the above-described analysis of the records. The GUI can be used to display the report. For example, the summary report generator can be adapted to generate a summary report that quantifies the performance of the control application (i.e., How well did the control application perform its functions?) and/or the effectiveness of the control application (What is the effective coverage of the control application?). In order to quantify the performance of the control application, the summary report can comprise the following entries: an entry that specifies the total number of events, an entry that specifies the number of events covered by a control application model, an entry that specifies the number of broken arrows, an entry that specifies the percentage of broken arrows, etc. In order to quantify the effectiveness of the control application, the summary report can comprise the following entries: an entry that specifies the total number of events, an entry that specifies the number of events covered by control application models, an entry that specifies the best-case percentage of control application coverage, an entry that specifies the number of events covered by control application models where the control application had inhibit ability, an entry that specifies the current percentage of coverage by control application models, etc. Quantification of performance and/or effectiveness of the control application can be based on some user-specified or default grouping (e.g., in wafer processing the grouping can be by tool type, by technology, by technology center, by chamber, by recipe, etc.)

Additionally, the summary report generator can be adapted to generate the summary report with drill down functions. Such drill down functions can be used to allow a user to link via the GUI to the records upon which the different line items in the summary report are based.

Also disclosed herein are embodiments of a method and an associated service for monitoring an advanced process control (APC) application, such as a fault detection and classification (FDC) application. Generally, the method embodiments can comprise identifying and accessing a plurality of data sources (e.g., data logs and databases) for the control application. The method can further comprise retrieving, from those data sources, all relevant data regarding selected events (i.e., data regarding selected transactions, stages, process steps or the like within the manufacturing environment, such as wafer-chamber passes). That is, each time a selected event occurs (e.g., each time a selected wafer-chamber pass is performed on a new wafer) all relevant data that is associated with the selected event and that is stored by the control application in its data sources will be collected. The method can further comprise compiling this data in order to generate records of dataflow paths within the control application for specific events. Event dataflow path records can be time-stamped and stored on a data storage device.

The method can further comprise performing an analysis of the dataflow path records (e.g., in response to a specific query and/or automatically in response to a continual query) in order to detect any dataflow interruptions within the control application. Specifically, the process of analyzing the records can comprise performing a comparison between a dataflow path record of a current event (i.e., a near real-time event) and historical dataflow path records (i.e., the dataflow path records of prior events of the same type) to detect a dataflow interruption. The process of analyzing the records can further comprise analyzing the dataflow path records to determine the location of each dataflow interruption. Based on the location of the dataflow interruption, the control application failure can be classified. Notification (e.g., reports, alarms, etc.) can be provided to users of such control application failures and their root causes.

In addition to detecting control application failures and determining the root causes of those failures, the method can comprise generating summary reports indicating the status of the control application (e.g., over a given period of time), based on the analysis of the records, and outputting or displaying (e.g., on a graphical user interface (GUI)) the summary reports. For example, each summary report can quantify the performance and/or the effectiveness of the control application over a given time period, as discussed above. Also, as discussed above, the summary report can be generated according to some grouping (e.g., in wafer processing the grouping can be by tool type, by technology, by technology center, etc.). Furthermore, each summary report can be generated with drill down functions allowing a user to link directly to the dataflow path records, upon which the report was based, using the GUI.

Finally, also disclosed are embodiments of a program storage device readable by computer and tangibly embodying a program of instructions executable by the computer to perform the above-described method of monitoring a control application.

These and other aspects of the embodiments of the invention will be better appreciated and understood when considered in conjunction with the following description and the accompanying drawings. It should be understood, however, that the following descriptions, while indicating embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 7 is a table illustrating an exemplary drill down from the table of FIG. 6;

DETAILED DESCRIPTION OF EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

In view of the foregoing, disclosed herein are embodiments of a system, method, and service that provide near real-time monitoring of a control application in a manufacturing environment in order to detect and determine the root cause of faults within the control application. Specifically, the embodiments monitor dataflow within a control application during certain events (i.e., certain transactions, stages, process steps, etc.) occurring in the manufacturing environment. A comparison of the dataflow path for a current event with the historical dataflow path records can be used to detect dataflow interruptions (i.e., fails) within the control application. The location of such a dataflow interruption can in turn be used to determine the root cause of the control application fail. Additionally, the system and method can generate summary reports indicating the status of the control application (e.g., over a given period of time), based on the analysis of the records. These summary reports can, for example, quantify the performance of the control application (e.g., by indicating a percentage of events during a given period of time for which the control application should have collected data and failed) and/or quantify the effectiveness of the control application (e.g., by indicating a percentage of the events during a given period of time for which the control application had inhibit). These summary reports can further be generated with drill downs providing a user with direct access to the records upon which the reports were based.

Figure 1:
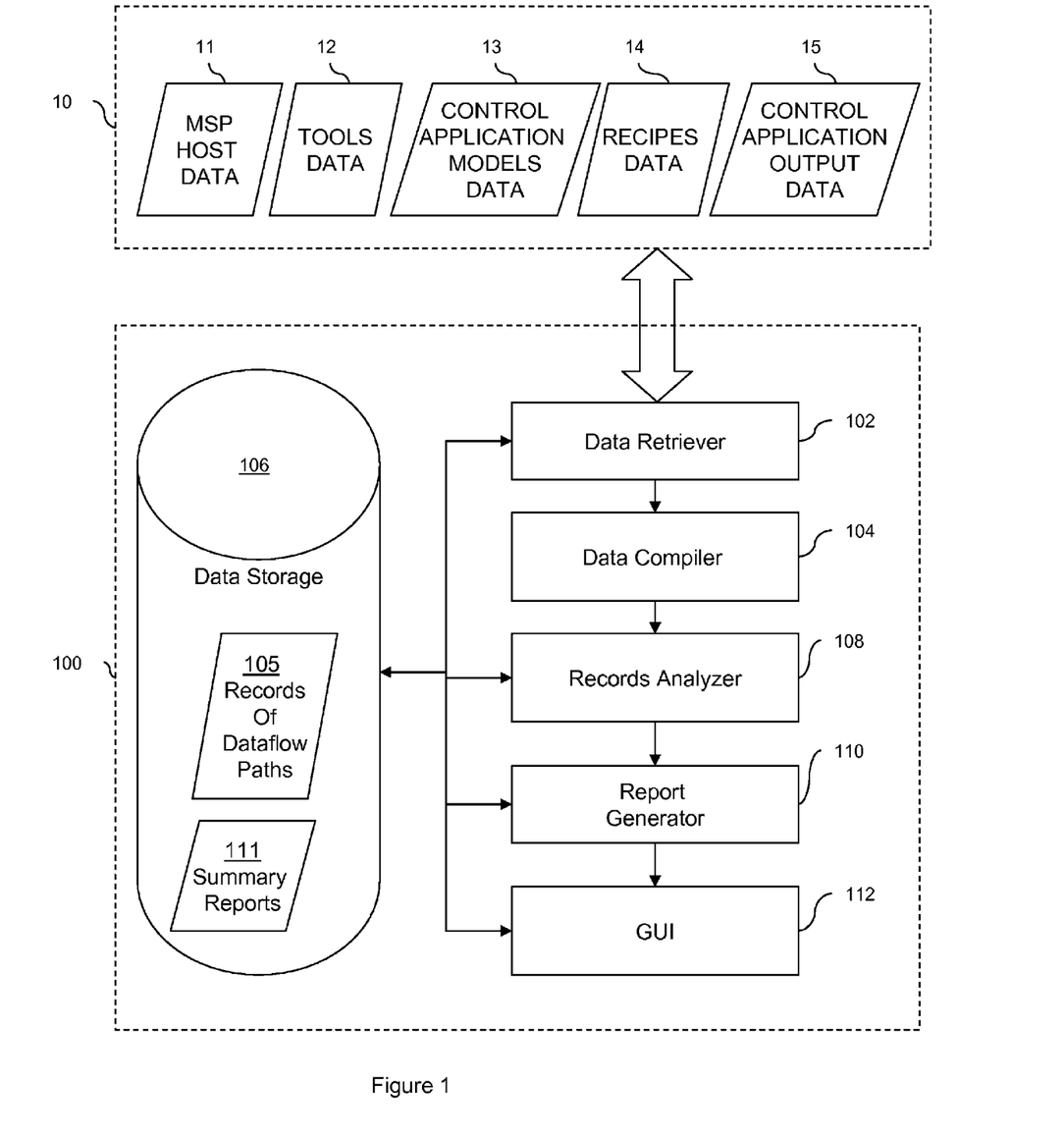
FIG. 1 is a diagram illustrating and embodiment of the system of the invention.

More specifically, referring to FIG. 1, disclosed herein is an embodiment of a system 100 for monitoring an advanced process control (APC) application (e.g., a fault detection and classification (FDC) application, a run-to-run (R2R) application, a model predictive control (MPC) application, sensor control and feedback application, etc.). Such APC applications generally collect data in a manufacturing environment and act (e.g., generate reports, provide warnings, etc.) based on that data in order to improve metrics, such as yield, costs, mean time between failures, etc. Thus, associated with each control application are data sources containing both raw and summary data.

For example, the system embodiment 100 can monitor a fault detection and classification (FDC) application that uses sensors and models to collect and monitor tool and/or process parameter data in an integrated circuit manufacturing environment in order to provide summary reports and early warnings of tool and/or process faults and, thereby, to avoid having to scrap wafers or entire lots of wafers.

The system embodiment 100 can comprise a data retriever 102 in communication with and adapted to access a plurality of previously identified data sources 10 associated with the control application. The data sources 10 can comprise, for example, data logs and/or database containing data (e.g., logistic data, raw data, summary data, etc.) acquired by the control application during the manufacturing process. The data logs and/or databases can be stored within storage devices of the various components of the control application and/or within a central data warehouse (e.g., a distributed manufacturing information warehouse (DMIW)). Data sources 10 associated with the control application can include, but are not limited to, the following: data sources 11 containing information from the machines supervisory program (MSP) which provides a code interface between the tools and the manufacturing execution system (MES); data sources 12 containing information about the various tools used during events (i.e., transactions, stages, process steps, etc.) occurring in the manufacturing environment; data sources 13 containing information about the various recipes used in the manufacturing environment; data sources 14 containing information about the control application models used in the manufacturing environment; and data sources 15 containing stored output (e.g., sensor records, statistical process and control (SPC) charts, etc.) of the control application in response to the different events that occur within the manufacturing environment and that are covered by control application models.

For example, if the manufacturing process is an integrated circuit manufacturing process and if the control application is a fault detection and classification (FDC) application which uses statistical process control (SPC) techniques, the output data 15 of the FDC application can be entries on SPC charts, in which sensor data from the various manufacturing tools is recorded during a given wafer-chamber pass. A wafer-chamber pass (i.e., a recipe-wafer-chamber pass) refers to each time a single wafer is placed in a chamber and processed within that chamber by one or more tools according to one or more recipe-specific steps.

The data retriever 102 can further be adapted to retrieve, from those data sources 10, all relevant data regarding selected events (i.e., regarding selected transactions, stages or process steps that occur during the manufacturing process, e.g., selected wafer-chamber passes that occur during wafer processing). That is, each time a selected event (e.g., a selected wafer-chamber pass) occurs on a new item (e.g., a wafer) being manufactured, the data retriever 102 will collect data that is associated with that selected event and that is stored in the various data sources 10 of the control application.

The system embodiment 100 can further comprise a data compiler 104 in communication with the data retriever 102 and adapted to compile this data in order to generate records 105 of dataflow paths within the control application for specific events. For example, the dataflow path records can show that every time a specific event occurs (e.g., each time a given wafer-chamber pass is performed on a new wafer), the same postings are made to the same data sources. Event dataflow path records can be time-stamped and stored by the data compiler 104 in a data storage device 106.

The system embodiment 100 can further comprise a records analyzer 108 in communication with the storage device 106 and adapted to access the records 105. The analyzer 108 is further adapted to perform an analysis of the records 105 (e.g., in response to a specific query and/or automatically in response to a continual query) in order to detect any dataflow interruptions within the control application. Specifically, a comparison between a dataflow path record for a current event (i.e., a near real-time event) and historical dataflow path records for prior events of the same type previously stored in the in storage 106 can be performed by the analyzer 108 to detect a dataflow interruption. That is, such a comparison can be used to detect an interruption in the known dataflow path for that event type, as established based on the historical records stored in the data storage device. For example, if the current event is a specific wafer-chamber pass known to have control application model coverage and if, in the past, this same wafer-chamber pass resulted in the posting of certain data to a data source (e.g., a SPC chart), then no such posting indicates that a dataflow interruption has occurred and, thus, an control application failure has occurred.

The analyzer 108 can further be adapted to determine the location within the control application of each dataflow interruption. Based on the location of the dataflow interruption, the control application failure can be classified. That is, a determination can be made by the analyzer 108 as to the root cause of the failure (e.g., a recipe error, model error, missing control chart, etc.). For example, in a given control application the dataflow path may be linear with data posting at different data sources sequentially (i.e., with data posting at one data source, then the next, and so on in succession). For example, in an exemplary FDC application the dataflow path may be from a machine supervisory program (MSP) to a process station for data acquisition (PSDA) to a multivariate analysis engine (e.g., MAE) to a disperser, to an SPC chart, etc. Since the flow of data is linear, failure of the data to post at a given data source will indicate that the failure has occurred upstream as opposed to downstream. While the control application dataflow path, discussed above is linear, non-linear (i.e., branching) control application dataflow paths are also anticipated and those skilled in the art will recognize that various logic applications can similarly be developed to determine the location of the dataflow interruption in such non-linear paths.

The system embodiment 100 can further a means by which a user can be automatically notified of a detected control application failure and, optionally, its location. For example, the system can be adapted to send automatically generated emails, sound alarms, etc., in order to notify a user of a detected control application failure.

The system embodiment 100 can further comprise a graphical user interface (GUI) 112 as well as a summary report generator 110 in communication with the analyzer 108, the data storage device 106 and the GUI 112. This summary report generator 110 can be adapted to tally up various numbers within the records 105 in order to generate summary reports 111 indicating the status of the control application (e.g., over a given period of time), based on the analysis of the records. Such summary reports 111 can be stored in the data storage 106. The GUI 112 can be used to display the summary reports 111 automatically or in response to user queries. Specifically, the summary report generator 110 can, for example, be adapted to generate a summary report 111 that quantifies, for a given time period, the performance of the control application (i.e., How well did the control application perform its functions?) and/or the effectiveness of the control application (What is the effective coverage of the control application?).

Quantification of performance and/or effectiveness of the control application can be for a specified period of time and based on some user-specified or default grouping (e.g., by technology type, by tool type, by technology center, by chamber, by model, by recipe, etc.) as specified in a user query.

Figure 2:
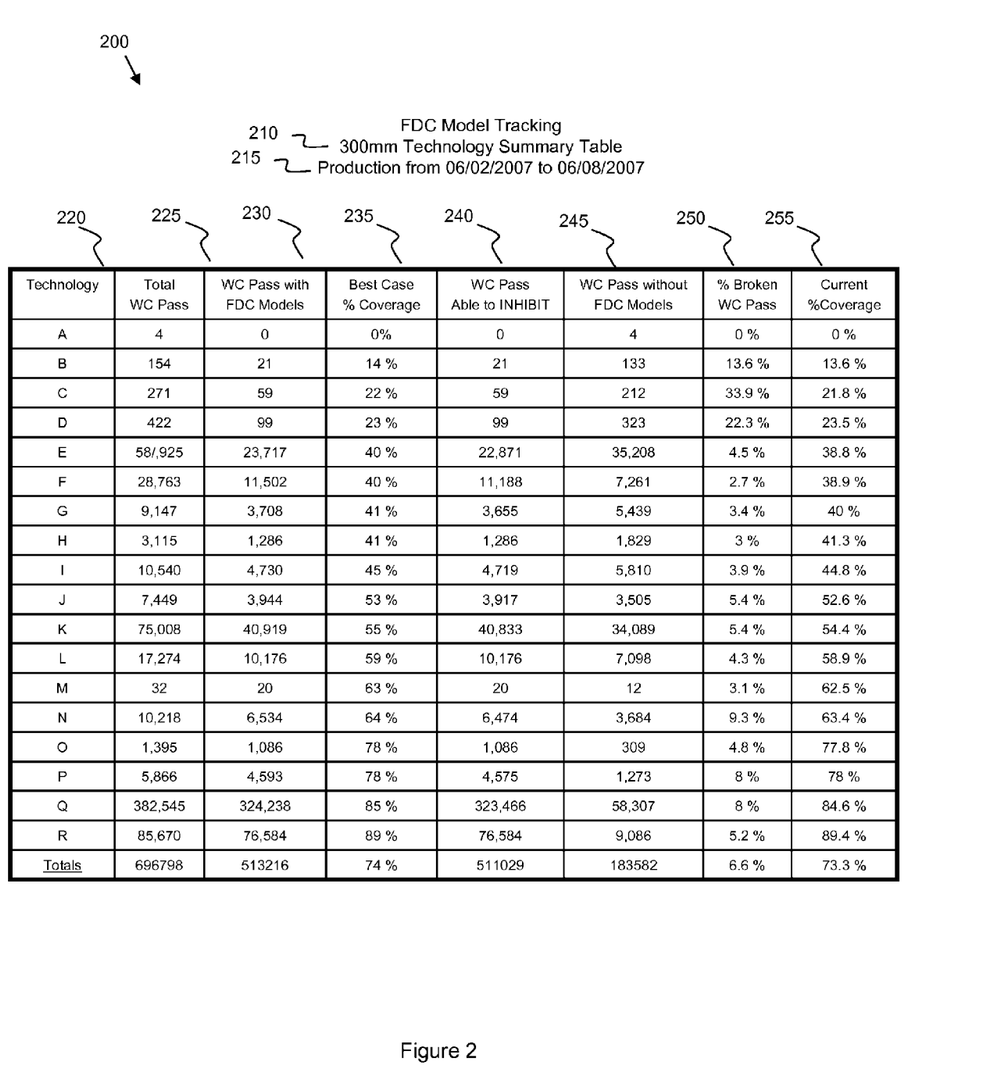
FIG. 2 is a table illustrating an exemplary technology summary report.

For example, in integrated circuit manufacturing, one such grouping can be by technology type. Technology type can be defined as an aggregate of processes that define the manufacturing process (e.g., in integrated circuit manufacturing, 300 mm technology refers to processing of 300 mm wafers, 90 nm technology refers to wafer processing during which the minimum gate width is 90 nm, etc.). FIG. 2 provides a table illustrating an exemplary summary report 200 by technology type 210 (300 mm technology) over a given time period 215 (Jun. 2, 2007-Jun. 8, 2007), where column 220 specifies different technologies within the 300 mm technology type (e.g., 130 nm Logic, 90 nm Logic, 45 nm Logic, etc.).

Figure 3:
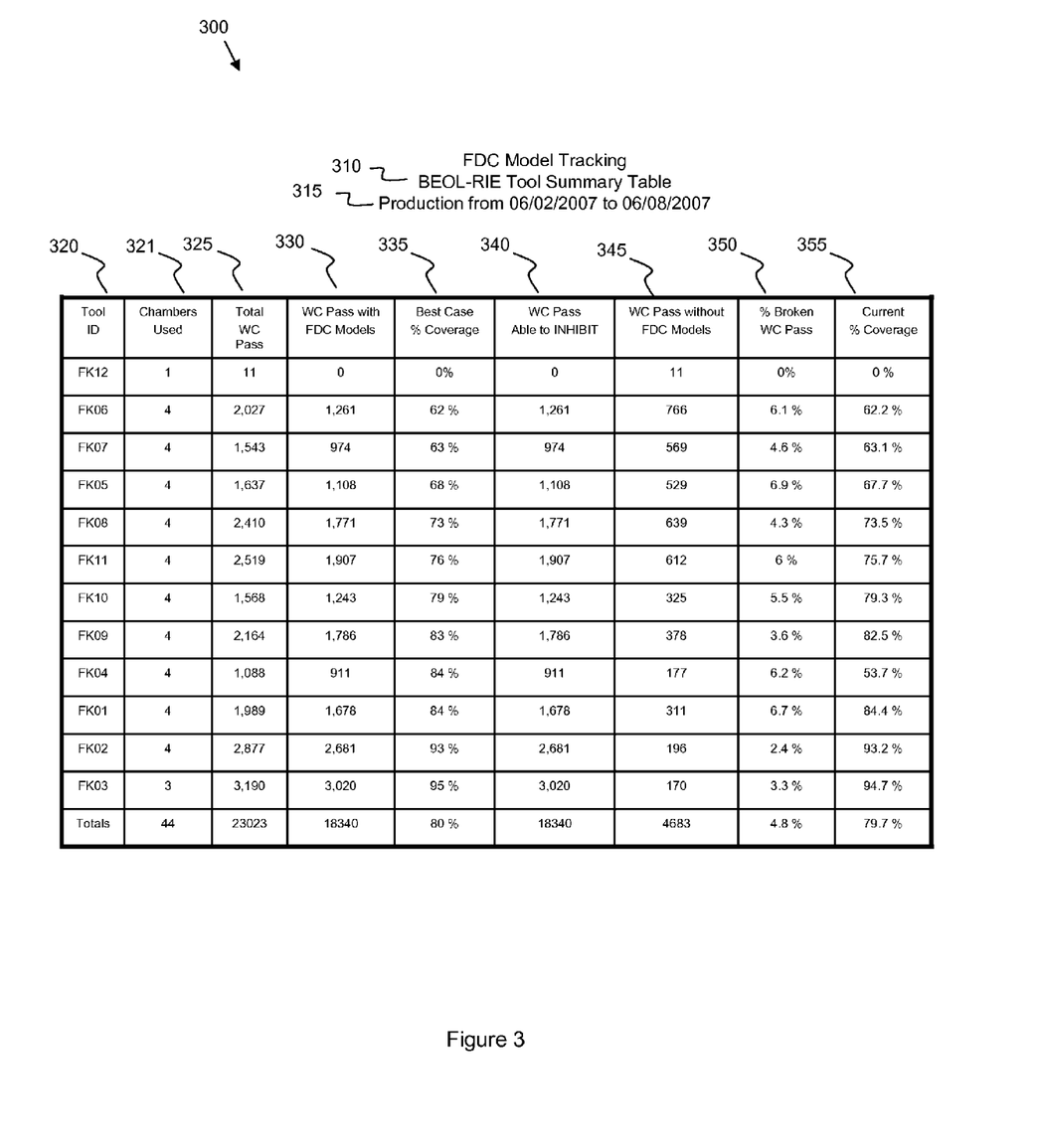
FIG. 3 is a table illustrating another exemplary tool type summary report.

Another grouping in integrated circuit manufacturing can be by tool type. Tool type can be defined as a collection of tools that perform a similar process, for example, reactive ion etch (RIE) tools contain both plasma etch and plasma strip tools. FIG. 3 provides a table illustrating an exemplary summary report 300 by tool type 310 over a given time period 315 (Jun. 2, 2007-Jun. 8, 2007), where column 320 specifies the different tools by tool identification number (ID) and where each of the identified tools, in this case, is within a given back end of the line reactive ion etch (BEOL_RIE) tool type (i.e., a tool type that performs back end of the line (BEOL) reactive ion etch (RIE) processes).

Figure 4:
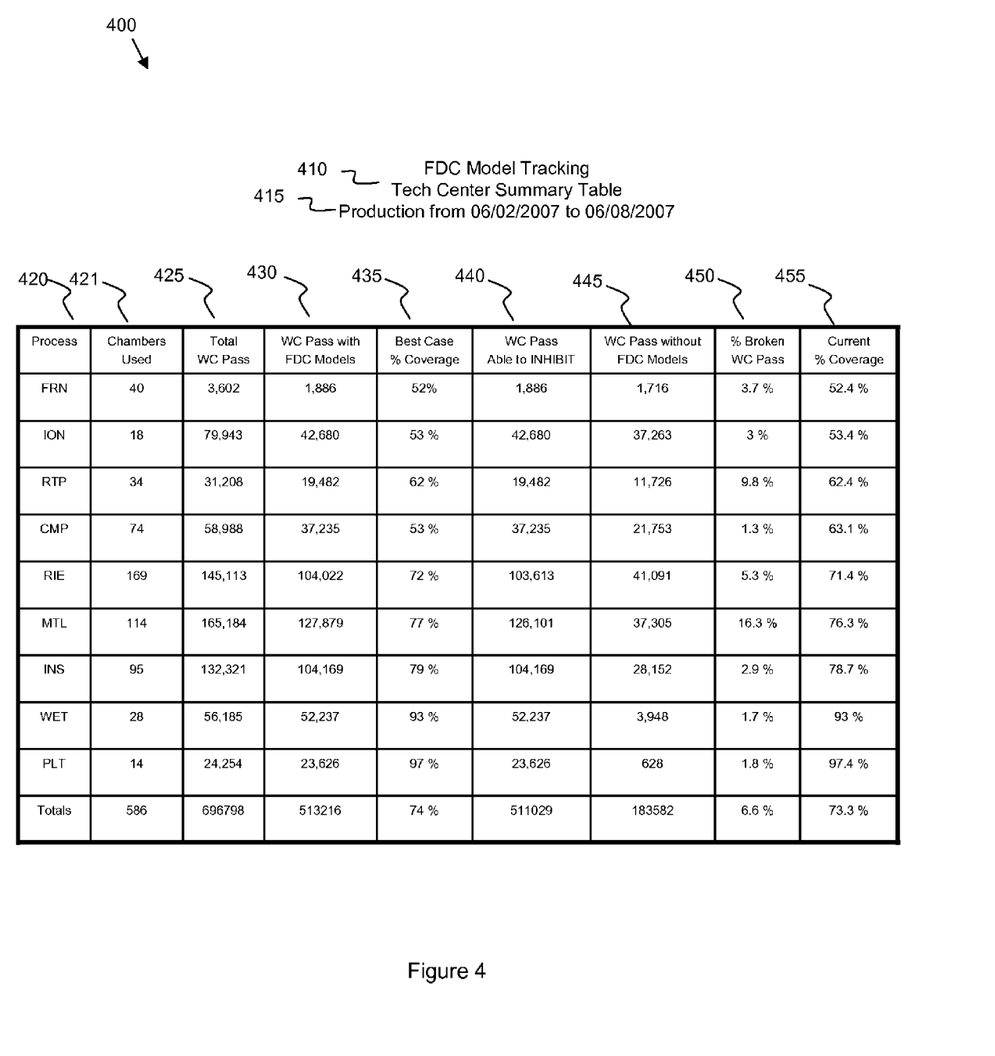
FIG. 4 is a table illustrating yet another exemplary technology center summary report.

Yet another grouping in integrated circuit manufacturing can be by technology center. Technology center can be defined as a collection of process type (e.g., rapid thermal processing (RTP), ion implantation (ION), chemical mechanical polishing (CMP), metal film deposition (MTL), insulator deposition (INS), wet clean processing (WET), plating (PLT), reactive ion etching (RIE), furnace (FRN), etc. FIG. 4 provides a table illustrating an exemplary summary report 400 by technology center 410 over a given time period 415 (Jun. 2, 2007-Jun. 8, 2007), where column 420 specifies different processes used.

In order to quantify the performance of the control application, the summary report can comprise, for example, the following entries, for each row beginning with a technology, tool or technology center entry in the first column (see columns 220 of FIG. 2, 320 of FIG. 3, and 420 of FIG. 4): (1) an entry that specifies the total number of events performed in that technology, by that tool, with that process, during the given period of time (see columns 225 of FIG. 2, 325 of FIG. 3, and 425 of FIG. 4); (2) an entry that specifies the number of events covered by control application models (see columns 230 of FIG. 2, 330 of FIG. 3, and 430 of FIG. 4); (3) an entry that specifies the number of broken arrows (i.e., the number of events performed in that technology, by that tool or with that process, during the given time period, for which the control application should have collected data and failed); and/or (4) an entry that specifies the percentage of broken arrows (i.e., the percentage of events performed in that technology, by that tool or with that process, during the given period of time, for which the control application should have collected data and failed over the total number of events that occurred during that same time period, see columns 250 of FIG. 2, 350 of FIG. 3, and 450 of FIG. 4), etc.

In order to quantify the effectiveness of the control application, the summary report can comprise, for example, the following entries, for each row beginning with a technology, tool or technology center entry in the first column (see columns 220 of FIG. 2, 320 of FIG. 3, and 420 of FIG. 4): (1) an entry that specifies the total number of events performed in technology, by that tool or with that process, during the given period of time (see columns 225 of FIG. 2, 325 of FIG. 3, and 425 of FIG. 4); (2) an entry that specifies the number of events covered by control application models (see columns 230 of FIG. 2, 330 of FIG. 3, and 430 of FIG. 4); (3) an entry that specifies the best-case percentage of control application coverage (i.e., an entry that specifies the percentage of events covered by control application models out of the total number of events, see columns 235 of FIG. 2, 335 of FIG. 3, and 435 of FIG. 4); (4) an entry that specifies the number of events covered by control application models where the control application had inhibit ability (see columns 240 of FIG. 2, 340 of FIG. 3, and 440 of FIG. 4); and/or (5) an entry that specifies the current percentage of coverage by control application models (i.e., the percentage of events during a given period of time for which the control application had inhibit ability out of the total number of events, see columns 255 of FIG. 2, 355 of FIG. 3, and 455 of FIG. 4), etc. Inhibit ability refers to the control applications ability to stop (i.e., inhibit) the process if a fail is detected (i.e., if a determination is made by an FDC application that a given tool or process is outside set parameters).

Additionally, the summary report generator 110 can be adapted to generate summary reports with drill down functions. Such drill down functions can be multi-tiered and can be used to allow a user to link via the graphical user interface to the records upon which the different line items in each summary report are based. That is, referring to FIGS. 2-4, the various entries may be selected providing additional details regarding, status, errors, performance and coverage.

Figure 5:
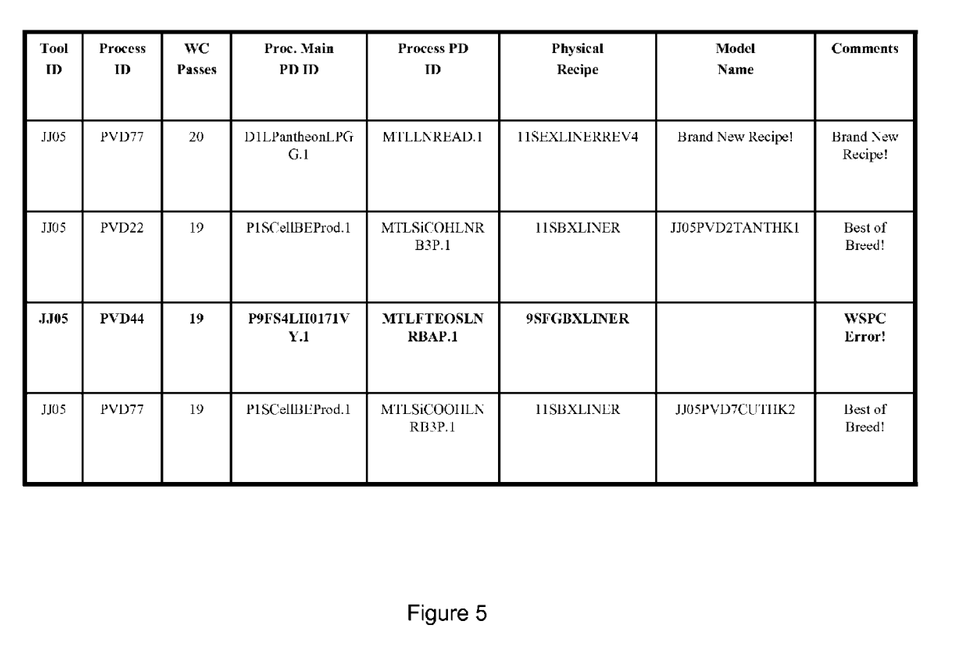
FIG. 5 is a table illustrating an exemplary drill down from a tool type summary report.
Figure 6:
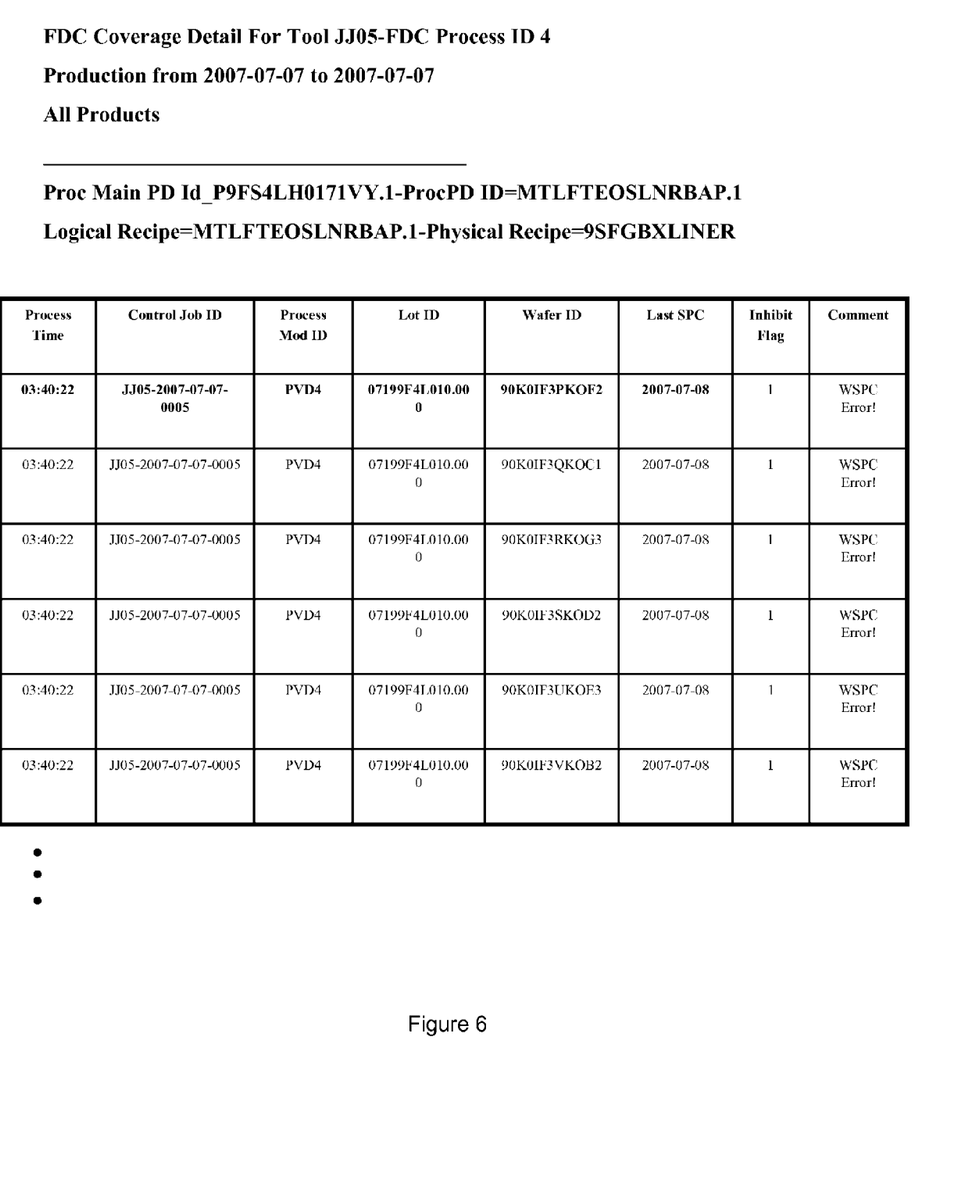
FIG. 6 is a table illustrating an exemplary drill down from the table of FIG. 5.

For example, from a tool type summary report a user may select a specific Tool ID (e.g., JJ05) in order to pull up the table of FIG. 5. The table of FIG. 5 breaks down the total number of wafer chamber passes performed by tool ID JJ05, according to different recipe-tool-chamber combinations. That is, each row identifies the number of wafer-chamber passes performed by tool ID JJ05, using the same recipe-tool-chamber combination. The first row of FIG. 5 illustrates a recipe-tool-chamber combination in which the recipe is new such that there is no comparison data for broken arrow identification. However, the third row of FIG. 5 illustrates a recipe-tool-chamber combination resulting in a broken arrow (i.e., an error). From the table of FIG. 5, a user may select the specific recipe-tool-chamber that resulted in an error (i.e., row 3) in order to pull up the table of FIG. 6. The table of FIG. 6 breaks down each of the wafer-chamber passes that were performed using the error producing recipe-tool-chamber combination of row 3 of FIG. 5 by wafers. From the table of FIG. 6, a user may select an individual wafer (e.g., 90K0IF3PKOF2) in order to pull up the table of FIG. 7. The table of FIG. 7 provides the root cause details of the error relative to that individual wafer.

Figure 8:
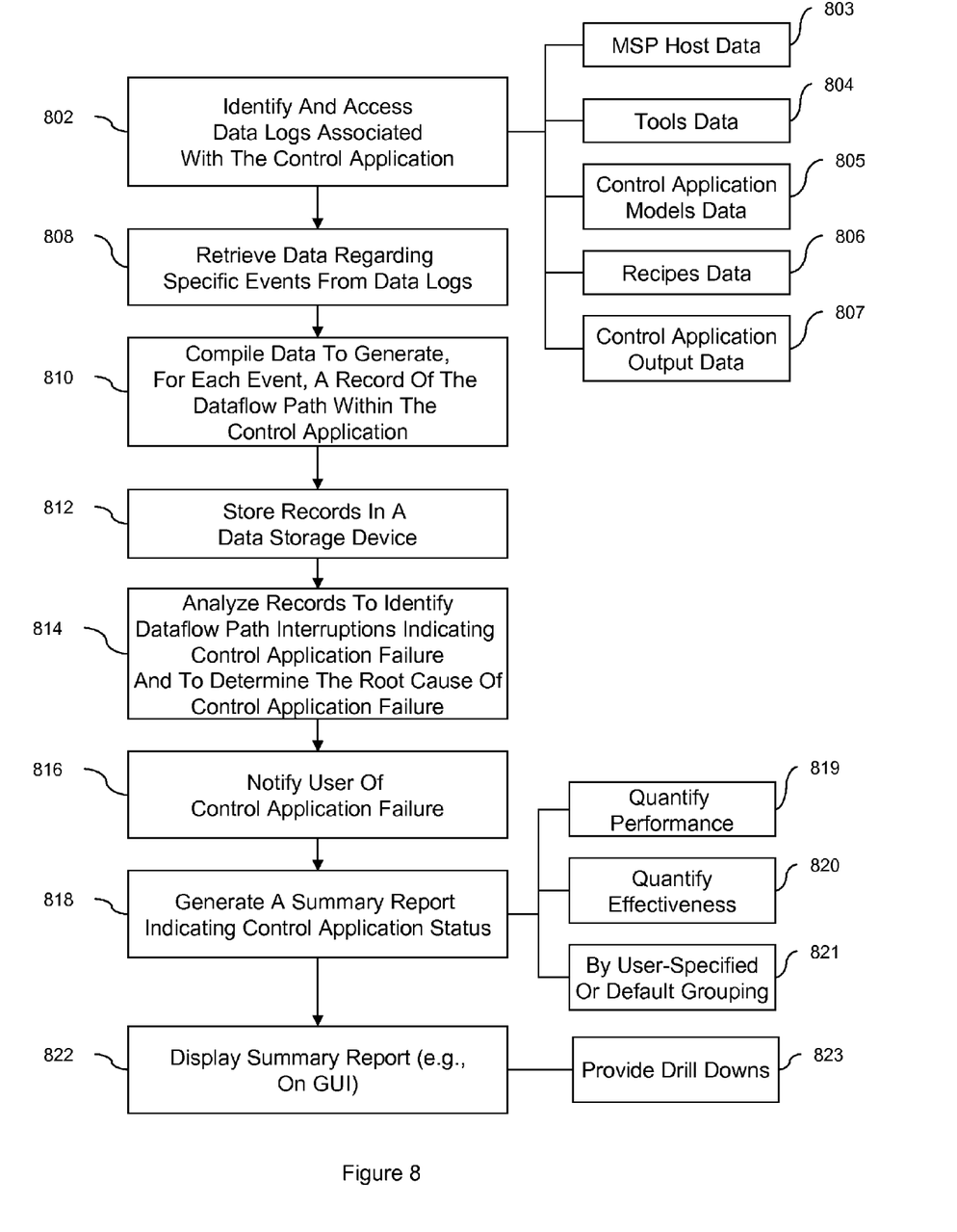
FIG. 8 is a flow diagram illustrating an embodiment of the method of the invention.

Referring to FIG. 8, also disclosed herein are embodiments of a method for monitoring an advanced process control (APC) application (e.g., a fault detection and classification (FDC) application, a run-to-run (R2R) application, a model predictive control (MPC) application, sensor control and feedback application, etc.) that collects data in a manufacturing environment and acts based on that data in order to improve metrics, such as yield, costs, mean time between failures, etc. Specifically, a broad embodiment of the method can comprise identifying and accessing a plurality of data sources for the control application (802). The data sources can comprise, for example, data logs and/or databases containing data (e.g., logistic data, raw data, summary data, etc.) acquired by the control application during the manufacturing process. These data logs and/or databases can be stored within storage devices of the various components of the control application and/or within a central data warehouse (e.g., a distributed manufacturing information warehouse (DMIW)). The data sources associated with the control application can include, but are not limited to, the following: data sources containing information from a machines supervisory program (MSP) which provides a code interface between the manufacturing tools and the manufacturing execution system (MES) (803); data sources containing information about the various tools used during events (i.e., transactions, stages, process steps, etc.) occurring in the manufacturing environment) (804); data sources containing information about the various recipes used in the manufacturing environment (805); data sources containing information about the control application models used in the manufacturing environment (806); and data sources containing stored outputs of the control application (e.g., sensor records, statistical process and control (SPC) charts, etc.) following events that occurs within the manufacturing environment and that are covered by control application models (807).

The method can further comprise retrieving, from those data sources, all relevant data regarding selected events (i.e., data regarding selected transactions, stages, process steps or the like within the manufacturing environment, such as wafer-chamber passes) (808). That is, each time a selected event occurs (i.e., each time the transaction is performed on a new item, such as a wafer, being manufactured) data that is associated with the selected event and that is stored by the control application in its data sources will be collected.

The method can further comprise compiling this data in order to generate records of dataflow paths within the control application for specific events (810). These dataflow path records can show that every time a specific event occurs, the same postings are made to the same data sources. Event dataflow path records can be time-stamped and stored on a data storage device. (812)

The method can further comprise performing an analysis of the dataflow path records (e.g., in response to a specific query and/or automatically in response to a continual query) in order to detect any dataflow interruptions within the control application (814). Specifically, the process of analyzing the records can comprise performing a comparison between a dataflow path record of a current event (i.e., a near real-time event) and historical dataflow path records (i.e., the dataflow path records of prior events of the same type) to detect a dataflow interruption. That is, such a comparison can be used to detect any interruption in the known dataflow path for that event type, as established based on the historical records stored in the data storage device. For example, if a given event is known to have control application coverage and if, in the past, this same event resulted in the posting of certain data to the data sources, then no such posting indicates that a dataflow interruption has occurred and, thus, indicates that a control application failure has occurred. The process of analyzing the records can further comprise analyzing the dataflow path records to determine the location of each dataflow interruption. Based on the location of the dataflow interruption, the control application failure can be classified. That is, a determination can be made as to the root cause of the failure (e.g., a recipe error, model error, missing control chart, etc.). Notification (e.g., reports, alarms, etc.) can be provided to users of such control application failures and their root causes (816).

In addition to detecting control application failures and determining the root causes of those failures, the method can comprise generating a summary report indicating the status of the control application (e.g., over a given period of time), based on the analysis of the records, and outputting or displaying (e.g., on a graphical user interface (GUI)) the summary report (818). This summary report can, for example, quantify the performance (819) and/or the effectiveness (820) of the control application.

As discussed in detail above and illustrated in the exemplary summary reports of FIGS. 2-4, the process of generating the summary report can comprise quantifying the performance of the control application by providing in the report one or more entries that reflect how well the control application performed its functions and/or quantifying the effectiveness of the control application by providing in the report one or more entries that reflect the coverage of the control application. Also as discussed in detail above and illustrated in FIGS. 2-4, the summary report can be generated according to some grouping (e.g., by tool type, by technology, by technology center, etc.) (821). Furthermore, the summary report can be generated with drill down functions allowing a user to link directly to the dataflow path records, upon which the report is based, using a graphical user interface (GUI) (822-823).

Figure 9:
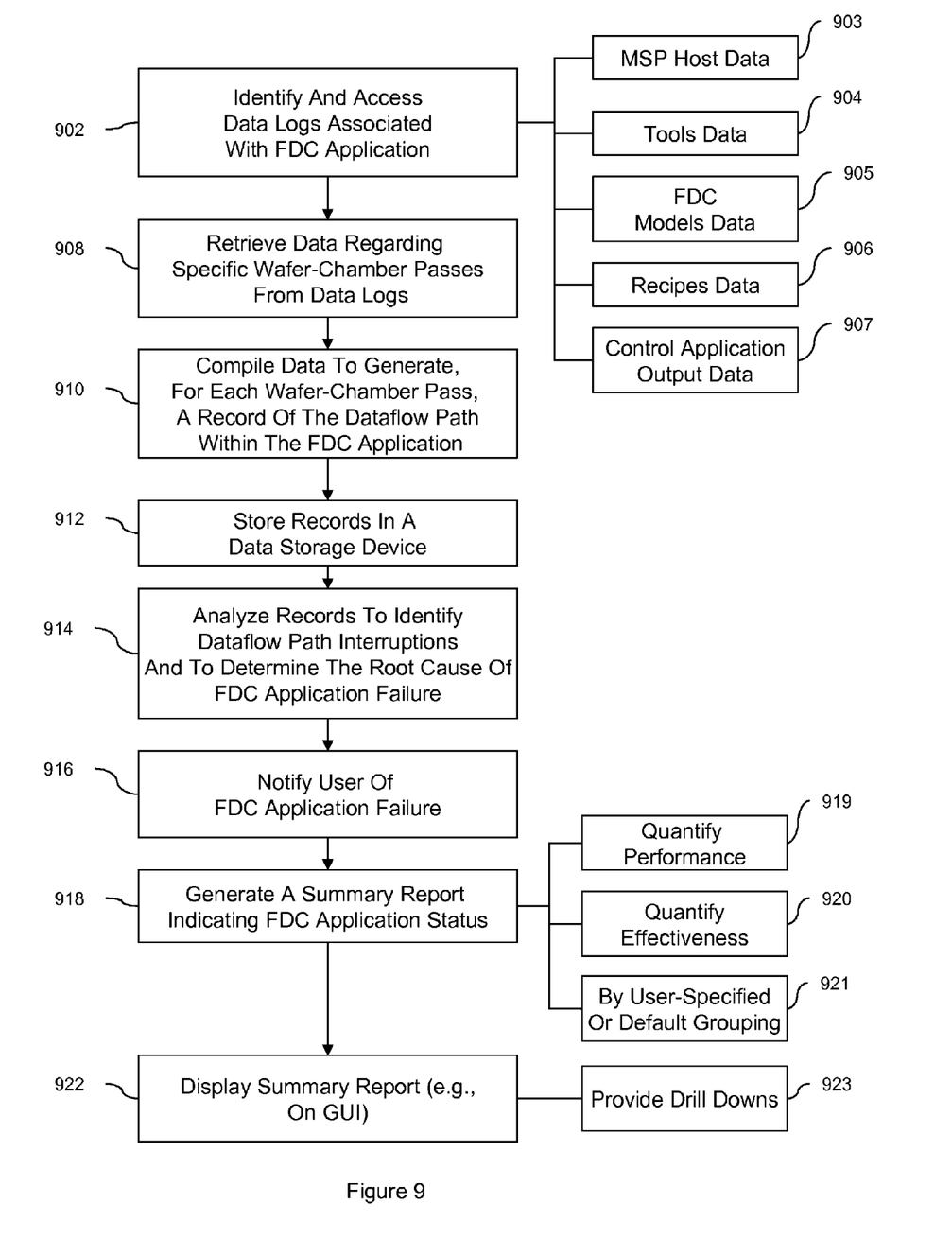
FIG. 9 is a flow diagram illustrating another embodiment of the method of the invention.

Referring to FIG. 9, a more narrow embodiment of the method can specifically monitor a fault detection and classification (FDC) application that uses models to collect and monitor tool and/or process parameter data in an integrated circuit manufacturing environment in order to provide an early warning of tool and/or process faults and, thereby, to avoid having to scrap wafers or entire lots of wafers.

This embodiment can similarly comprise identifying and accessing a plurality of data sources for the FDC application (902). The data sources can comprise, for example, data logs and/or databases containing data (e.g., logistic data, raw data, summary data, etc.) acquired by the FDC application during wafer processing. The data logs and/or databases can be stored within storage devices of the various components of the FDC application and/or within a central database (e.g., a distributed manufacturing information warehouse (DMIW)).

The data sources associated with the FDC application can include, but are not limited to, the following: data sources containing information from a machines supervisory program (MSP) which provides a code interface between the manufacturing tools and the manufacturing execution system (MES) (903); data sources containing information about the various tools used during wafer-chamber passes (904); data sources containing information about the various recipes used during wafer-chamber passes (905); data sources containing information about the FDC models (906); and data sources containing stored output of the FDC application (907). Specifically, if the FDC application uses statistical process control (SPC) techniques, the output of the FDC application can be SPC charts, in which sensor data from manufacturing tools used during a given wafer-chamber pass is recorded. As mentioned above, a wafer-chamber pass (i.e., a recipe-wafer-chamber pass) refers to each time a single wafer is placed in a chamber and processed within that chamber by one or more tools according to one or more recipe-specific steps.

This embodiment can further comprise retrieving, from those data sources, all relevant data regarding selected wafer-chamber passes (908). That is, each time a selected wafer-chamber pass is performed on a new wafer, data that is associated with the selected event and that is stored will be collected from the data sources of the FDC application.

This embodiment can further comprise compiling the collected data in order to generate records of dataflow paths within the FDC application for specific wafer-chamber passes (910). These dataflow path records can show that every time a specific wafer-chamber pass is performed on a new wafer, the same postings are made to the same SPC chart. Event dataflow path records can be stored on a data storage device.

This embodiment can further comprise performing an analysis of the dataflow path records (e.g., in response to a specific query and/or automatically in response to a continual query) in order to detect a dataflow interruption within the FDC application (914). Specifically, the process of analyzing the records can comprise performing a comparison between a dataflow path record of a current wafer-chamber pass (i.e., a near real-time wafer-chamber pass) and historical dataflow path records for the same wafer-chamber pass to detect a dataflow interruption. That is, such a comparison can be used to detect an interruption in the known dataflow path for that specific wafer-chamber pass, as established based on the records stored in the data storage device. More specifically, if a specific wafer-chamber pass is known to have FDC model coverage and if, in the past, that same wafer-chamber pass resulted in the posting of certain data to a SPC chart, then no such posting indicates that a dataflow interruption has occurred and, thus, indicates that an FDC application failure has occurred. The process of analyzing the records can further comprise analyzing the dataflow path records to determine the location of the FDC application failure. Based on the location of the dataflow interruption, the FDC failure can be classified. That is, a determination can be made as to the root cause of the FDC failure (e.g., a recipe error, model error, missing control chart, etc.). Notification (e.g., reports, alarms, etc.) can be provided to users of such FDC application failures and their root causes (916).

In addition to detecting FDC application failures and determining the root causes of those failures, the method can comprise generating a summary report indicating the status of the fault detection and classification application (e.g., over a given period of time), based on the analysis of the records, and outputting or displaying (e.g., on a graphical user interface (GUI)) the summary report (918). This summary report can, for example, quantify the performance and/or the effectiveness of the FDC application (919-920).

As discussed in detail above and illustrated in the exemplary summary reports of FIGS. 2-4, the process of generating the summary report can comprise quantifying the performance of the FDC application by providing in the report one or more entries that reflect how well the control application performed its functions (919). In order to quantify the performance of the FDC application the summary report can contain the following: (1) an entry that specifies the total number of wafer-chamber passes performed in that technology, by that tool or with that process, during the given period of time (see columns 225 of FIG. 2, 325 of FIG. 3, and 425 of FIG. 4); (2) an entry that specifies the number of wafer-chamber passes covered by FDC application models (see columns 230 of FIG. 2, 330 of FIG. 3, and 430 of FIG. 4); (3) an entry that specifies the number of broken arrows (i.e., the number of wafer-chamber passes performed in that technology, by that tool or with that process, during the given time period, for which the FDC application should have collected data and failed); and/or (4) an entry that specifies the percentage of broken arrows (i.e., the percentage of wafer-chamber passes performed in that technology, by that tool or with that process, during the given period of time, for which the FDC application should have collected data and failed over the total number of wafer-chamber passes that occurred during that same time period, see columns 250 of FIG. 2, 350 of FIG. 3, and 450 of FIG. 4), etc.

Also, as discussed in detail above and illustrated in the exemplary summary reports of FIGS. 2-4, the process of generating the summary report can comprise quantifying the effectiveness of the FDC application by providing in the report one or more entries that reflect the coverage of the FDC application (920). In order to quantify the effectiveness of the FDC application, the summary report can contain the following: (1) an entry that specifies the total number of wafer-chamber passes performed in that technology, by that tool or with that process, during the given period of time (see columns 225 of FIG. 2, 325 of FIG. 3, and 425 of FIG. 4); (2) an entry that specifies the number of wafer-chamber passes covered by FDC application models (see columns 230 of FIG. 2, 330 of FIG. 3, and 430 of FIG. 4); (3) an entry that specifies the best-case percentage of FDC application coverage (i.e., an entry that specifies the percentage of wafer-chamber passes covered by FDC application models out of the total number of wafer-chamber passes, see columns 235 of FIG. 2, 335 of FIG. 3, and 435 of FIG. 4); (4) an entry that specifies the number of wafer-chamber passes covered by control application models where the control application had inhibit ability (see columns 240 of FIG. 2, 340 of FIG. 3, and 440 of FIG. 4); and/or (5) an entry that specifies the current percentage of coverage by FDC application models (i.e., the percentage of wafer-chamber passes during a given period of time for which the FDC application had inhibit ability out of the total number of wafer-chamber passes, see columns 255 of FIG. 2, 355 of FIG. 3, and 455 of FIG. 4), etc. Inhibit ability refers to the control applications ability to stop (i.e., inhibit) the process if a fail is detected (i.e., if a determination is made by an FDC application that a given tool or process is outside set parameters).

Also as discussed in detail above and illustrated in FIGS. 2-4, the summary report can be generated according to some grouping (e.g., by tool type, by technology, by technology center, etc.) (921). Furthermore, the summary report can be generated with drill down functions allowing a user to link directly to the dataflow path records, upon which the report is based, using a graphical user interface (GUI) (see FIGS. 5-7 and discussion above, 922-923).

In addition to the method embodiments, described above, also disclosed herein are associated service embodiments in which the method of the invention is specifically performed for another, for example, performed by a computer service provider for a manufacturing customer, usually for a fee.

The embodiments of the invention can further take the form of an entirely hardware embodiment, an entirely software embodiment or an embodiment including both hardware and software elements. In an embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
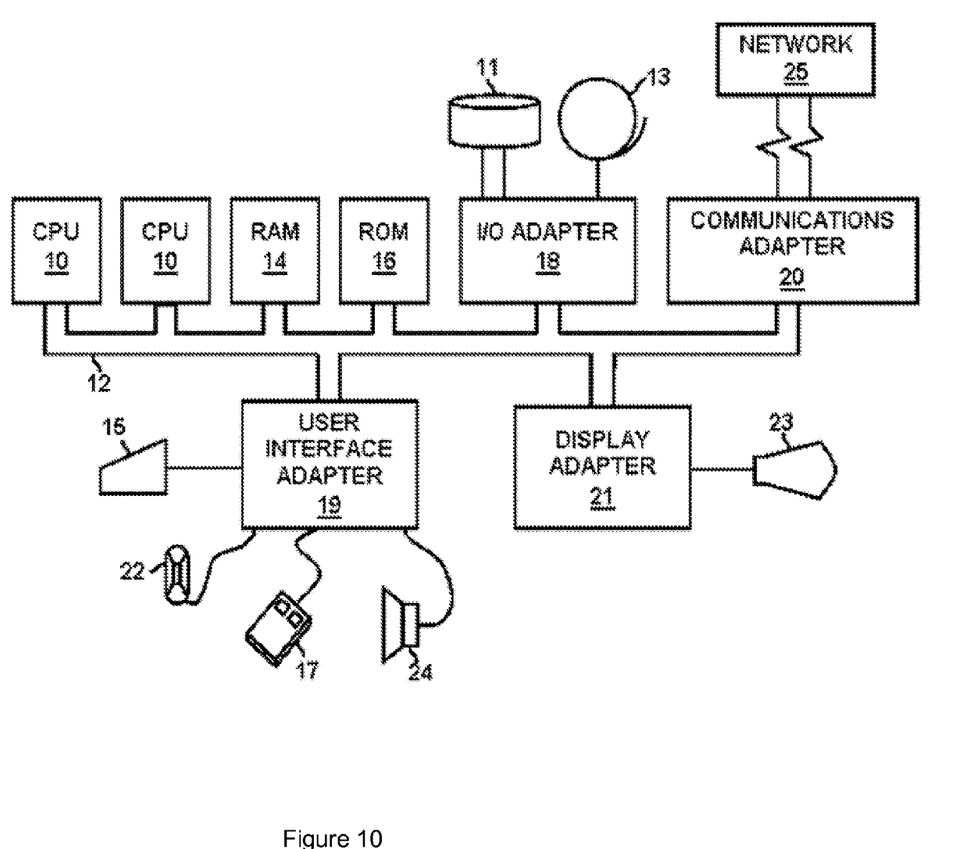
FIG. 10 is a schematic diagram of an exemplary hardware structure that may be used to implement the system and method of the invention.

A representative hardware environment for practicing the embodiments of the invention is depicted in FIG. 10. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Therefore, disclosed above are embodiments of the invention that provide near real-time monitoring of a control application in a manufacturing environment in order to detect and determine the root cause of faults within the control application. The embodiments monitor the flow of data within a control application during certain events (i.e., certain transactions, stages, process steps, etc.). By comparing a dataflow path for a near real-time event with historical dataflow path records, dataflow interruptions (i.e., fails) within the control application can be detected. By determining the location of such a dataflow interruption, the root cause of the control application fail can be determined. Additionally, the invention can generate summary reports indicating the status of the control application (e.g., over a given period of time), based on the analysis of the records. For example, the summary reports can quantify the performance of the control application (e.g., by indicating a percentage of events during a given period of time for which the control application should have collected data and failed) and/or can quantify the effectiveness of the control application (e.g., by indicating a percentage of the events during a given period of time for which the control application had inhibit ability). These summary reports can further be generated with drill downs to provide a user with direct access to the records upon which the reports were based.

The information made available to users by the disclosed embodiments (i.e., control application failure notices, root cause of failure notices, summary reports and drill downs) will allow users to act in order to ultimately improve yield and enhance productivity. For example, this information may precipitate rerouting of products to different tool types or technology centers with control application coverage. Identification of tools with control application coverage and maximizing use of such tools will minimizes scrap events. The information will allow users to act in order to optimize equipment utilization. That is, the information may be used to track tool performance and availability statistics for production control and management and further to make production decisions, such as fab loading decisions. In an indirect way, the information may be used to monitor equipment availability (i.e., equipment up-time). Finally, the information may be used to identify problem areas within the control application and to prioritize repairs.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of embodiments, those skilled in the art will recognize that the embodiments of the invention can be practiced with modification within the spirit and scope of the appended claims.

What is claimed is:

1. A system for monitoring a control application in a manufacturing environment, said system comprising:

a data retriever adapted to access a plurality of data sources for said control application, to retrieve, from said data sources, data regarding events occurring in said manufacturing environment;

a data compiler adapted to compile said data so as to generate, for said events, records of dataflow paths within said control application;

a data storage device, wherein said data compiler is further adapted to store said records in said data storage device;

a records analyzer adapted to perform an analysis of said records so as to detect a dataflow interruption within said control application; and a summary report generator adapted to generate a summary report indicating a status of said control application based on said analysis, wherein said summary report generator is further adapted to generate said summary report with drill down functions so as to allow a user to link via a graphical user interface directly to said records.

2. The system of claim 1, wherein said drill down functions provide a user with additional details regarding at least one of control application status, control application errors, control application performance and control application coverage.

3. The system of claim 1, wherein said drill down functions are multi-tiered.

4. The system of claim 1, wherein said records analyzer is further adapted to perform said analysis in response to at least one of a specific query and a continual query.

5. The system of claim 1, wherein said analysis comprises a comparison between a record of a current event and records of prior events to detect said dataflow interruption.

6. The system of claim 1, wherein said summary report indicates said status of said control application over a given period of time.

7. A system for monitoring a control application in a manufacturing environment, said system comprising:

a data retriever adapted to access a plurality of data sources for said control application, to retrieve, from said data sources, data regarding events occurring in said manufacturing environment;

a data compiler adapted to compile said data so as to generate, for said events, records of dataflow paths within said control application;

a data storage device, wherein said data compiler is further adapted to store said records in said data storage device;

a records analyzer adapted to perform an analysis of said records so as to detect a dataflow interruption within said control application, to determine a location within said control application of said dataflow interruption and, based on said location, to determine a root cause of a failure in said control application; and a summary report generator adapted to generate a summary report indicating a status of said control application based on said analysis, wherein said summary report generator is further adapted to generate said summary report with drill down functions so as to allow a user to link via a graphical user interface directly to said records.

8. The system of claim 7, wherein said drill down functions provide a user with additional details regarding at least one of control application status, control application errors, control application performance and control application coverage.

9. The system of claim 7, wherein said drill down functions are multi-tiered.

10. The system of claim 7, wherein said records analyzer is further adapted to perform said analysis in response to at least one of a specific query and a continual query.

11. The system of claim 7, wherein said analysis comprises a comparison between a record of a current event and records of prior events to detect said dataflow interruption.

12. The system of claim 7, wherein said summary report indicates said status of said control application over a given period of time.

13. A system for monitoring a fault detection and classification application in a manufacturing environment, said system comprising:

a data retriever adapted to access a plurality of data sources for said fault detection and control application, to retrieve, from said data sources, data regarding events occurring in said manufacturing environment;

a data compiler adapted to compile said data so as to generate, for said events, records of dataflow paths within said fault detection and control application;

a data storage device, wherein said data compiler is further adapted to store said records in said data storage device;

a records analyzer adapted to perform an analysis of said records so as to detect any dataflow interruptions within said fault detection and classification application; and a summary report generator adapted to generate a summary report indicating a status of said fault detection and classification application based on said analysis, wherein said summary report generator is further adapted to generate said summary report with drill down functions so as to allow a user to link via a graphical user interface directly to said records.

14. The system of claim 13, wherein said events comprise wafer-chamber passes.

15. The system of claim 13, wherein said drill down functions provide a user with additional details regarding at least one of fault detection and classification application status, fault detection and classification application errors, fault detection and classification application performance and fault detection and classification application coverage.

16. The system of claim 13, wherein said drill down functions are multi-tiered.

17. The system of claim 13, wherein said records analyzer is further adapted to perform said analysis in response to at least one of a specific query and a continual query.

18. The system of claim 13, wherein said analysis comprises a comparison between a record of a current event and records of prior events to detect said dataflow interruption.

19. The system of claim 13, wherein said records analyzer is further adapted to determine a location within said fault detection and classification system of each of said any dataflow interruptions and, based on said location, to determine a root cause of a failure in said fault detection and classification system.

20. The system of claim 13, wherein said summary report indicates said status of said fault detection and classification application over a given period of time.

* * * * *